United States Patent [19]
Yamamoto

[11] 4,444,060
[45] Apr. 24, 1984

[54] FLUID PRESSURE SENSING APPARATUS

[75] Inventor: Yasuo Yamamoto, Tokyo, Japan

[73] Assignee: Nihon Cambridge Filter Kabushiki Kaisha, Tokyo, Japan

[21] Appl. No.: 351,736

[22] Filed: Feb. 23, 1982

[30] Foreign Application Priority Data

Mar. 6, 1981 [JP] Japan .................................. 56-31294
Mar. 6, 1981 [JP] Japan .................................. 56-30354

[51] Int. Cl.³ .......................... G01F 1/46; G01P 5/165
[52] U.S. Cl. ................................................. 73/861.66
[58] Field of Search ........................ 73/861.65, 861.66

[56] References Cited

U.S. PATENT DOCUMENTS

| | | | |
|---|---|---|---|
| 1,250,238 | 12/1917 | Spitzglass | 73/861.66 |
| 1,508,017 | 9/1924 | Greve | 73/861.66 |
| 3,751,982 | 8/1973 | Lambert | 73/861.66 |
| 4,036,054 | 7/1977 | Goulet | 73/861.66 |

Primary Examiner—Herbert Goldstein
Attorney, Agent, or Firm—Berman, Aisenberg & Platt

[57] ABSTRACT

A fluid pressure sensor apparatus includes one or a plurality of fluid pressure sensor elements. Each fluid pressure sensor element comprises a flat hollow structure which extends transverse to the direction of flow of a fluid. An upstream chamber is open through dynamic pressure measuring holes which extend in the direction of the flow, and a downstream chamber is open through static pressure measuring holes which extend transverse to the flow direction. The upstream chamber acts to average the dynamic pressure and the downstream chamber measures static pressure. An auxiliary ridge-like member is located downstream of the static pressure measuring holes.

12 Claims, 19 Drawing Figures

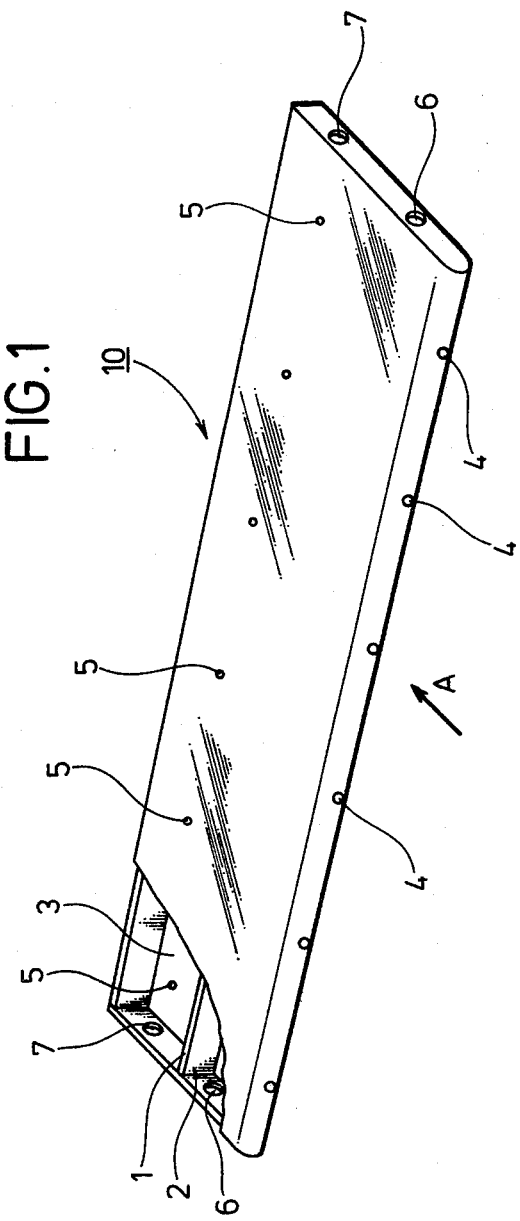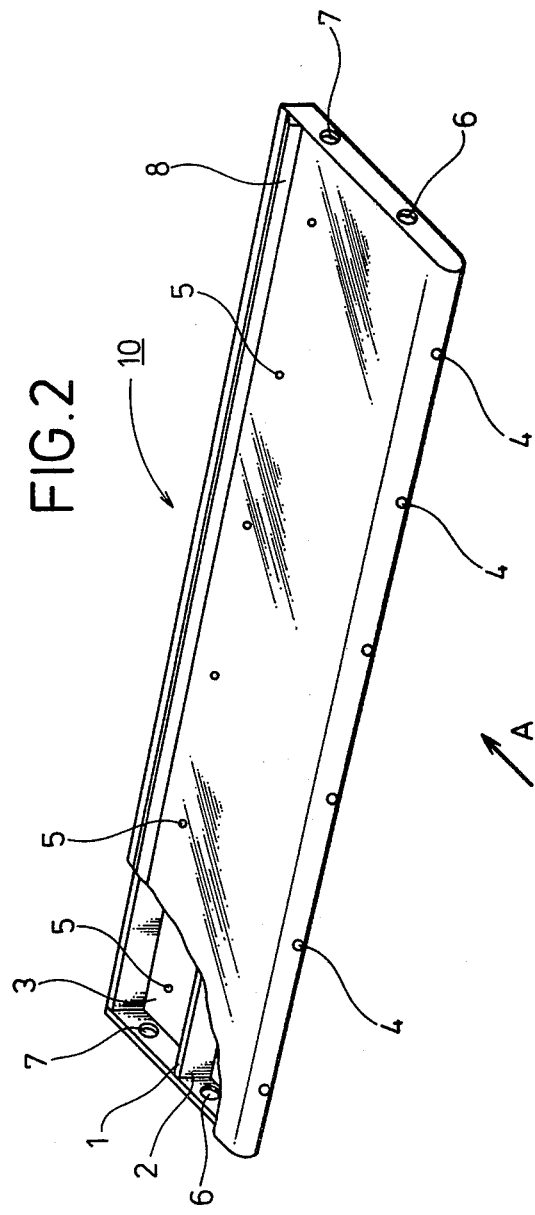

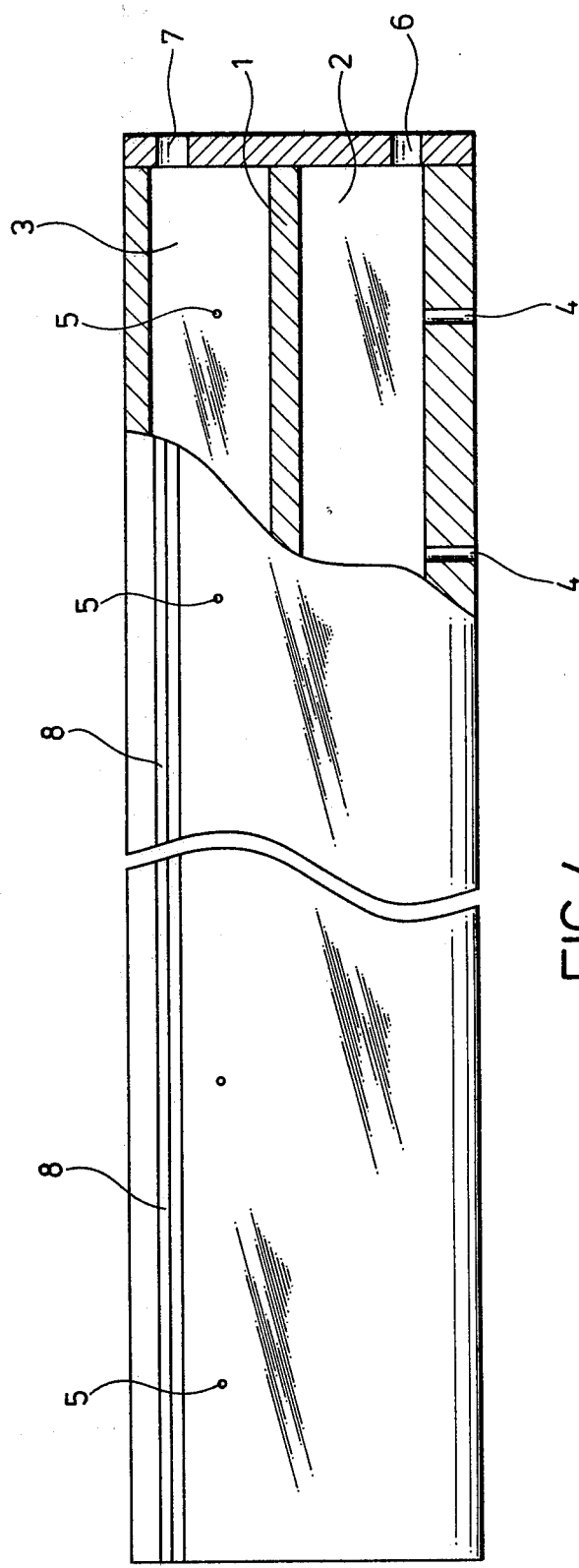
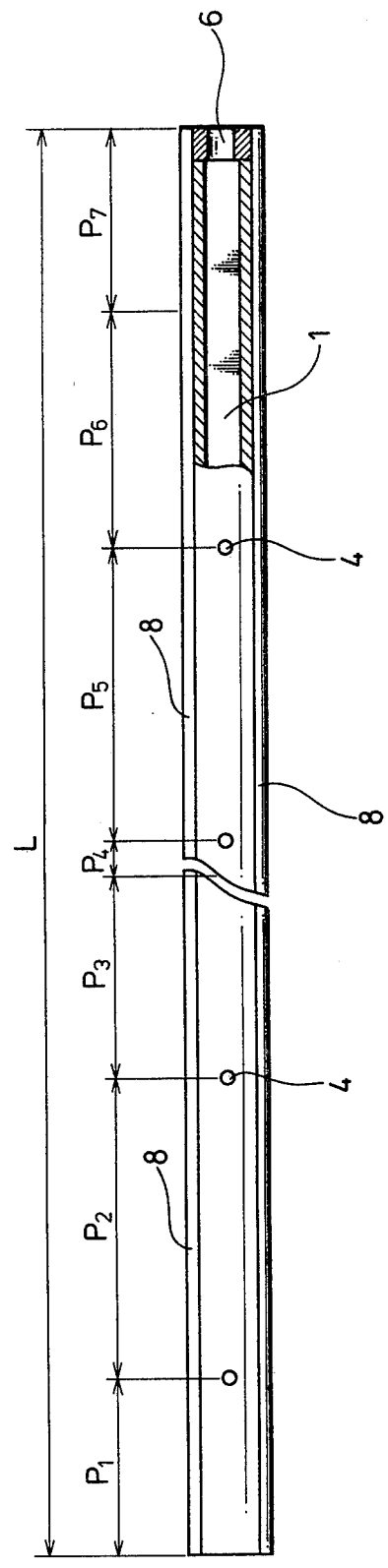
FIG.3
FIG.4

FLUID PRESSURE SENSING APPARATUS

TECHNICAL FIELD

The present invention relates to an apparatus adapted to detect the pressure (including total pressure and static pressure) of a fluid flowing through a duct.

BACKGROUND ART

The pitot tube is well known as a means to measure pressure of a fluid flowing through a duct. In the performance test of a ventilator, for example, it has been usual that the cross-section of the duct is divided into a plurality of equal areas and the arithmetic mean of the measurement values obtained by the pitot tube at the respective areas is calculated to obtain the average pressure (transverse cross-section division into equal areas utilizing pitot tube, JIS B 8330).

Certainly such procedure is appropriate when high accuracy is demanded such as in the performance test of a ventilator, but various problems are often encountered in the actual field of operation, for example, in an air conditioning equipment room. Specifically, this procedure requires a linear duct portion as a sum of such portions in front of and behind the measurement position, which is approximately ten times the duct diameter, to stabilize the fluid steam. However, such a space is often unavailable in a field of operation such as an air conditioning equipment room. Furthermore, it is difficult to establish the proper position as well as the proper angle of the pitot tube relative to the flow stream and errors often occur due to personal factors. A true mean value cannot be obtained unless the measurements at the respective areas are made simultaneously since the pressure distribution over the whole cross-section varies.

To overcome these problems, an apparatus has already been proposed, in which stationary tubular stream stabilizers provided with openings in the flow direction are located in association with the respective measurement points defined by the above procedure of transverse cross-section division into equal areas utilizing a pitot tube. Total pressure sensors and static pressure sensors are arranged on the downstream ends of the respective tubular stream stabilizers. The total pressure sensors associated with the respective tubular stream stabilizers communicate with one another by a total pressure manifold while the static pressure sensors associated with the respective tubular stream stabilizers similarly communicate with one another by a static pressure manifold. These manifolds include small tubes adapted to average total pressure and static pressure, respectively, and the total pressure is measured from said total pressure manifold while the static pressure is measured from the static pressure manifold.

With such apparatus of the prior art, however, the respective manifolds must be constructed in the form of complicated double pipes and the tubular stream stabilizers must be sufficiently long to minimize possible errors in measurement. This results in a total length of the apparatus which is inconveniently long.

With this apparatus of the prior art, the flow rate of the fluid is adjusted manually or automatically by opening and closing the damper blades on the basis of the values measured by the instruments. However, the instrument which measures the flow rate and the damper blades which adjust the flow rate are separately installed so that the distance from the instrument to the damper is disadvantageously large and, in consequence, an unacceptably long time delay occurs from the adjustment of the damper to the moment at which a change in the flow rate actually appears on the instrument. Thus, the flow rate adjustment has been troublesome with such apparatus of the prior art.

SUMMARY OF THE INVENTION

An essential object of the present invention is to provide an improved fluid pressure sensing apparatus and a fluid pressure sensor element used in this apparatus which can effectively overcome the previously mentioned problems of the conventional apparatus with a construction sufficiently simplified to reduce the apparatus length and which can effectively minimize possible measurement error.

According to the present invention, this object is achieved by the fluid pressure sensing apparatus which comprises at least one fluid pressure sensor element characterized in that said fluid pressure sensor element comprises a flat hollow structure which extends transverse to the direction in which a fluid flows through a duct, the hollow structure having therein a stationary partition which extends transverse to the flow direction to divide the interior of the hollow structure into an upstream chamber and a downstream chamber. A plurality of total pressure measuring holes extend through the upstream end wall of the hollow structure in the flow direction so that the upstream chamber of the hollow structure is open through said total pressure measuring holes, and a plurality of static pressure measuring holes extend transverse to the flow direction through at least one of the walls of said hollow structure which extend parallel to the flow direction so that the downstream chamber of said hollow structure is open through said static pressure measuring holes. The total pressure is measured from the upstream chamber and the static pressure is measured from the downstream chamber. A ridge-like auxiliary member for static pressure measurement extends from the exterior of said hollow structure in a direction transverse to the flow direction and at a position downstream of said static pressure measuring holes.

BRIEF DESCRIPTION OF THE DRAWINGS

FIGS. 1 and 2 are perspective views of the preferred embodiments of a fluid pressure sensor element according to the present invention;

FIG. 3 is a plan view showing, partially in section, the fluid pressure sensor element of FIG. 2;

FIG. 4 is a front elevation view showing, partially in section, the sensor element of FIG. 2;

DETAILED DESCRIPTION OF THE INVENTION

Figure 5:
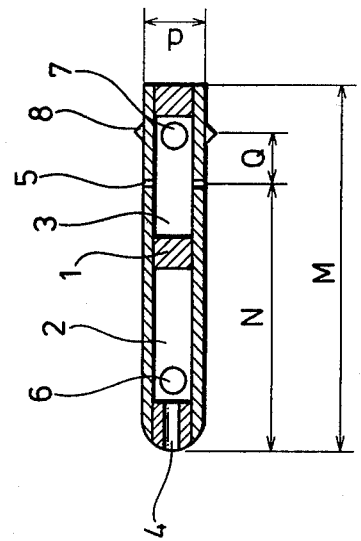
FIG. 5 is a cross-section of the sensor element of FIG. 2.

As shown in FIG. 1, the sensor element 10 of the present invention generally comprises a hollow, flat structure which extends transverse to the flow direction. A partitioning member 1 is fixed within the hollow flat structure also transverse to the flow direction and divides a space defined in the hollow structure into a pair of chambers, i.e., an upstream, or total pressure averaging chamber 2 and a downstream static pressure averaging chamber 3. A plurality of total pressure measuring holes 4, extend through the upstream end wall of the structure in the flow direction and communicate with one another via the total pressure averaging chamber 2. Accordingly, total pressures measured by the respective total pressure measuring holes 4, are averaged in the total pressure averaging chamber 2. Preferably, the upstream end wall having the total pressure measuring holes 4, is semicylindrical, as shown in FIG. 5, which shows a part of the structure in section.

Referring to FIG. 1, a plurality of static pressure measuring holes 5 are located in two parallel walls which extend along the flow direction. Each hole 5 extends through the associated wall in a direction transverse to the flow direction. These static pressure measuring holes 5 communicate with one another via the static pressure averaging chamber 3. Thus, static pressures measured by the respective measuring holes 5, are averaged in the static pressure averaging chamber 3. Although the static pressure measuring holes 5 are formed in two walls extending parallel to each other and also to the flow direction, in the specific embodiment shown, it is contemplated that these holes may be formed in only one of said walls.

Total pressure outlet 6 and static pressure outlet 7 have tubes connected to them which conduct the total pressure averaged in the total pressure averaging chamber 2 and the static pressure averaged in the static pressure averaging chamber 3, respectively, to associated measuring instruments such as manometers. Connection to the respective tubes will be conveniently achieved by formation of female threads or provision of nipples on said respective outlets. Although the respective outlets are provided at both ends of the chambers in the present embodiment, each of these outlets may be provided on only one end.

A fluid pressure sensor element 10 shown by FIG. 2 comprises an element as generally shown in FIG. 1, a hollow flat structure traverse to the flow direction, the interior of which is divided by the partitioning member 1 into a pair of chambers, i.e., the upstream chamber or the total pressure averaging chamber 2 and the downstream chamber or the static pressure averaging chamber 3, said total pressure averaging chamber 2 being provided with the total pressure measuring holes 4 and said static pressure averaging chamber 3 being provided with the static pressure measuring holes 5. Reference numerals 6, 7 respectively designate the total pressure outlets and the static pressure outlets. A ridge-like auxiliary member 8 for static pressure measuring, projects from the exterior of the hollow structure at a suitable position downstream of the static pressure measuring holes 5. Preferably, this ridge-like auxiliary member 8, for static pressure measuring, is continuous as shown, but it is possible to provide a plurality of separate such members in association with the respective static pressure measuring holes 5 and/or to realize this in a configuration other than the member as shown, which has a triangular cross-section.

Figure 6:
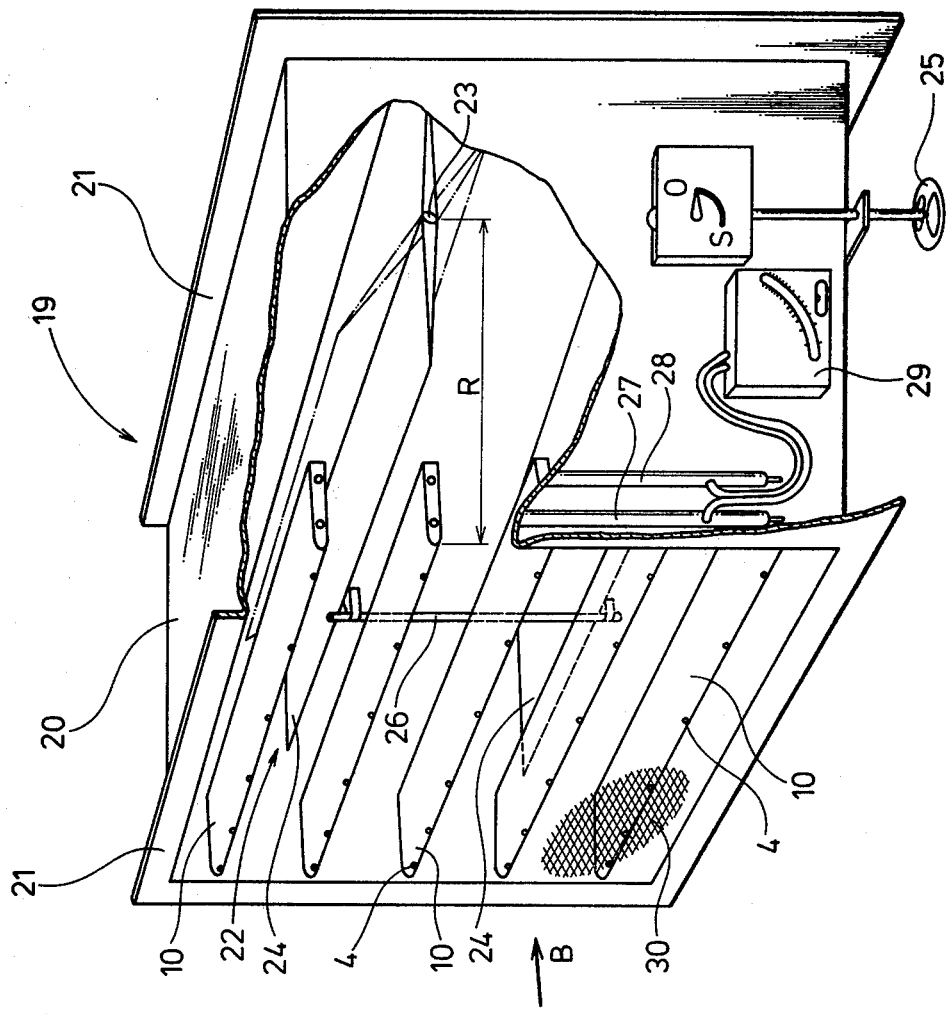
FIG. 6 is a perspective view of a preferred embodiment of the fluid pressure sensing apparatus according to the present invention.

FIG. 6 illustrates, in a perspective view, an embodiment of the fluid pressure sensor according to the present invention, which is adapted to be inserted midway of a duct through which fluid flows in the direction as indicated by an arrow B. The fluid pressure sensor 19 includes a frame 20, of molded sheet metal, and a damper means. The frame has an open end projecting outwardly so as to form a flange 21 by which the sensor is held midway of the duct.

A damper means 22 comprises damper blades 24 fixed on associated damper shafts 23 which are, in turn, journaled in side plates of the apparatus frame 20 so that the damper blades 24 are rotated by rotating said damper shafts 23 and thereby the inclination of said damper blades 24 with respect to the duct, to change the cross-sectional area of the duct, thus changing the flow rate of the fluid. There is provided a handle 25 for rotation of said damper shafts 23 externally of the apparatus frame 20 so that rotary operation of this handle 25, through gear engagement for example, causes the damper shafts 23 to rotate in operative association with each other. Although there are provided a pair of damper blades 24 in FIG. 6, it should be understood that a single blade, or three or more blades also may be employed. When a plurality of damper blades 24 are used, these respective damper blades 24 may be connected together by a connector member 26.

Fluid pressure sensor elements 10 are suspended on the apparatus frame so that the respective total pressure measuring holes 4 of the associated sensor elements are directed upstream with respect to the flow direction. The total pressure averaging chamber 2 and the static pressure averaging chamber 3 of each sensor element 10 communicate with a total pressure collecting pipe 27 and a static pressure collecting pipe 28 both provided on the exterior of the apparatus frame 20. In consequence, the respective total pressure averaging chambers 2 of the associated fluid pressure sensor elements 10, communicate with one another and the respective static pressure averaging chambers 3 of the associated fluid pressure sensor elements communicate also with one another via the total pressure collecting pipe 27 and the static pressure collecting pipe 28, respectively. Obviously, the total pressure collecting pipe 27 and the static pressure collecting pipe 28 may be connected to associated measuring elements 29 such as manometers or flow meters to determine an average dynamic pressure and a flow rate. Although there are provided the total pressure collecting pipe 27 and the static pressure collecting pipe 28 only on the side appearing in front as seen in FIG. 6, it is also possible to provide a similar pair of total pressure collecting pipes 27 and static pressure collecting pipes 28 on the opposite side wall so that the total pressure and the static pressure may be respectively averaged by these two pairs of collecting pipes provided on the both side walls.

Stream stabilizing means 30 comprises wire mesh or the like located upstream of the respective fluid pressure sensor elements 10.

When the fluid pressure sensor 19 including the damper means is practically installed in a field of operation such as an air conditioning equipment room for flow rate regulation, the handle 25 may be rotated to adjust the opening of the damper means 22 on the basis of various measuring instruments, for example, the manometers and the flow rate meters. Alternatively, said various measurements may be converted into the corresponding signals by which the flow rate is automatically controlled.

FIG. 6 shows the case in which the sensor is installed in the duct of rectangular cross-section. However, it is obviously possible to install the sensor according to the present invention in the duct of circular cross-section and, in such case, the fluid pressure sensor elements 10, may be radially arranged with respect to the duct center. Regardless of the shape of the duct cross-section, the necessary number of the fluid pressure sensor elements 10 depends upon the duct diameter and/or the precision with which the measurements such as the pressure and the flow rate should be obtained.

With the arrangement according to the present invention as has been described above, not only the fluid pressure sensor including the damper means is obtained as a compact unit, but also the distance between the damper means and the measuring instruments is effectively reduced, to reduce the time delay with which a change in the flow rate appears at the level of said measuring instruments and thereby a smooth flow rate adjustment may be achieved.

Referring to FIGS. 4 and 5, various dimensioning factors of each fluid pressure sensor element are designed by various reference letters as: L designates the length as measured transverse to the flow direction; M designates the length as measured in the flow direction; d designates the thickness; N designates the distance from the leading edge to the static pressure measuring hole 5; Q designates the distance from the static pressure measuring hole 5 to the ridge-like auxiliary member 8 for static pressure measuring; and P affixed with reference numbers designates pitches of the total pressure measuring holes 4 and the static pressure measuring holes 5, respectively. Thus, $P_1$ and $P_7$ designate distances from the adjacent edges to the respective measuring holes while $P_2$, $P_3$, $P_4$, $P_5$ and $P_6$ designate distances between respective pairs of adjacent measuring holes. Finally, R designates the distance from the leading edge to the damper shaft 23 of the damper means 22.

As previously mentioned, the practical field of operation, such as an air conditioning equipment room, often presents unfavorable conditions, such as the unavailability of space to accommodate a linear pipe portion for steam stabilization and different duct diameters. Therefore, the invention was tested on the assumption of a practical field of operation, to determine whether the sensor according to the present invention is useful in practice, and results were obtained as will be described below.

First, the following test procedures were conducted in a duct with the duct dimension of 300×200 mm and the results were studied.

(1) To determine the optimum length L of the fluid pressure sensor element 10, the influence of the position of the ridge-like auxiliary member 8 upon static pressure measuring, the static pressure was measured as a function of air speed and the results were studied. Dimensions of the fluid pressure sensor element 10, used for testing were (respective reference letters have the same significance as in FIGS. 4 and 5):

| | |
|---|---|
| L = 280 mm | M = 254 mm |
| d = 10 mm | $P_1 = P_7 = 40$ mm |
| $P_2 = P_6 = 100$ mm | $P_3 = P_4 = P_5 = 0$ mm (absent) |

Diameter of the static pressure measuring hole 5= ϕ 1 mm.

Figure 7:
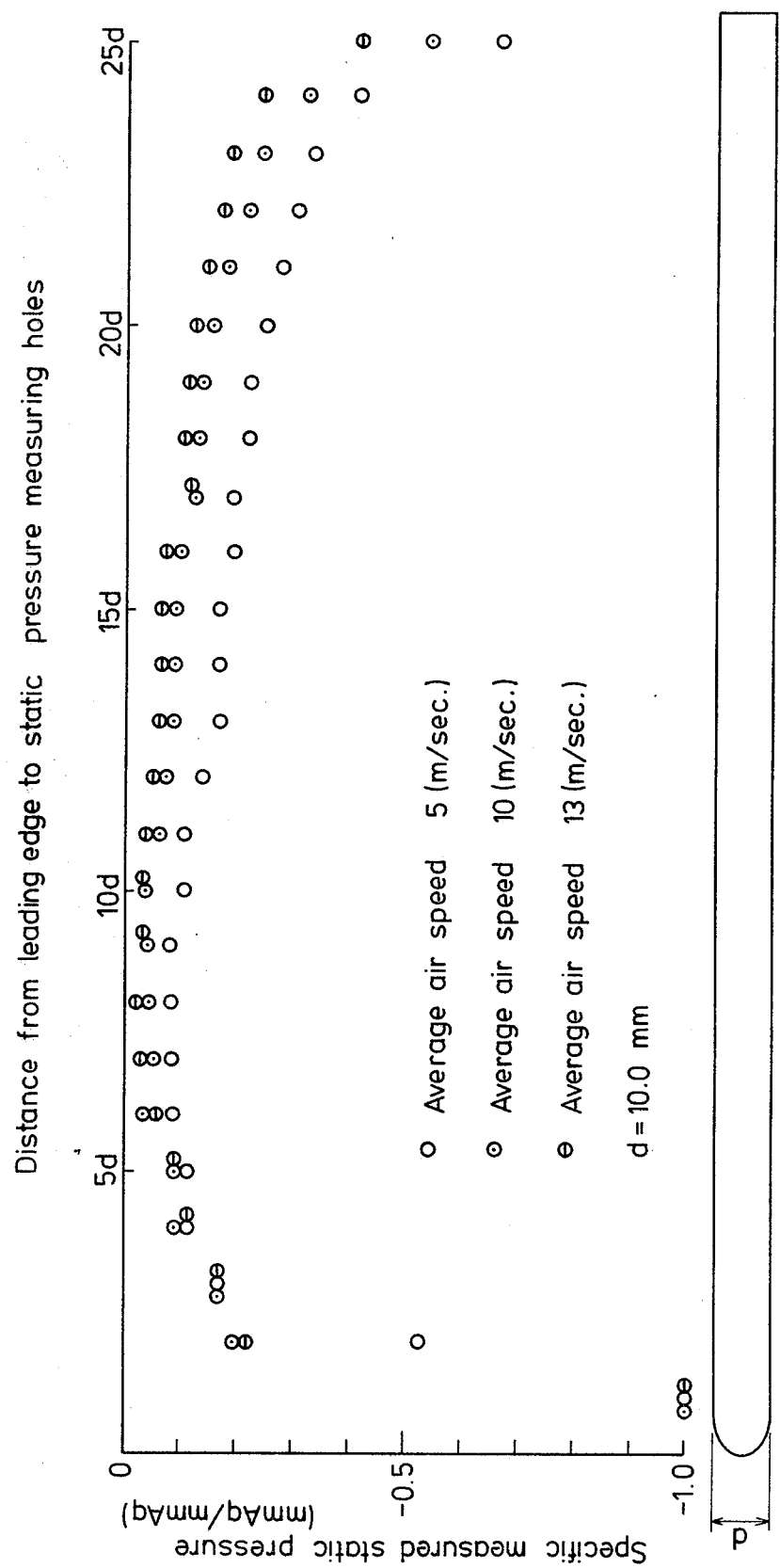
FIGS. 7 through 19 are charts illustrating the measurement value precision of the fluid pressure sensing apparatus according to the present invention in comparison with the measurement value obtained by the pitot tube on the basis of various test procedures.
Figure 8:
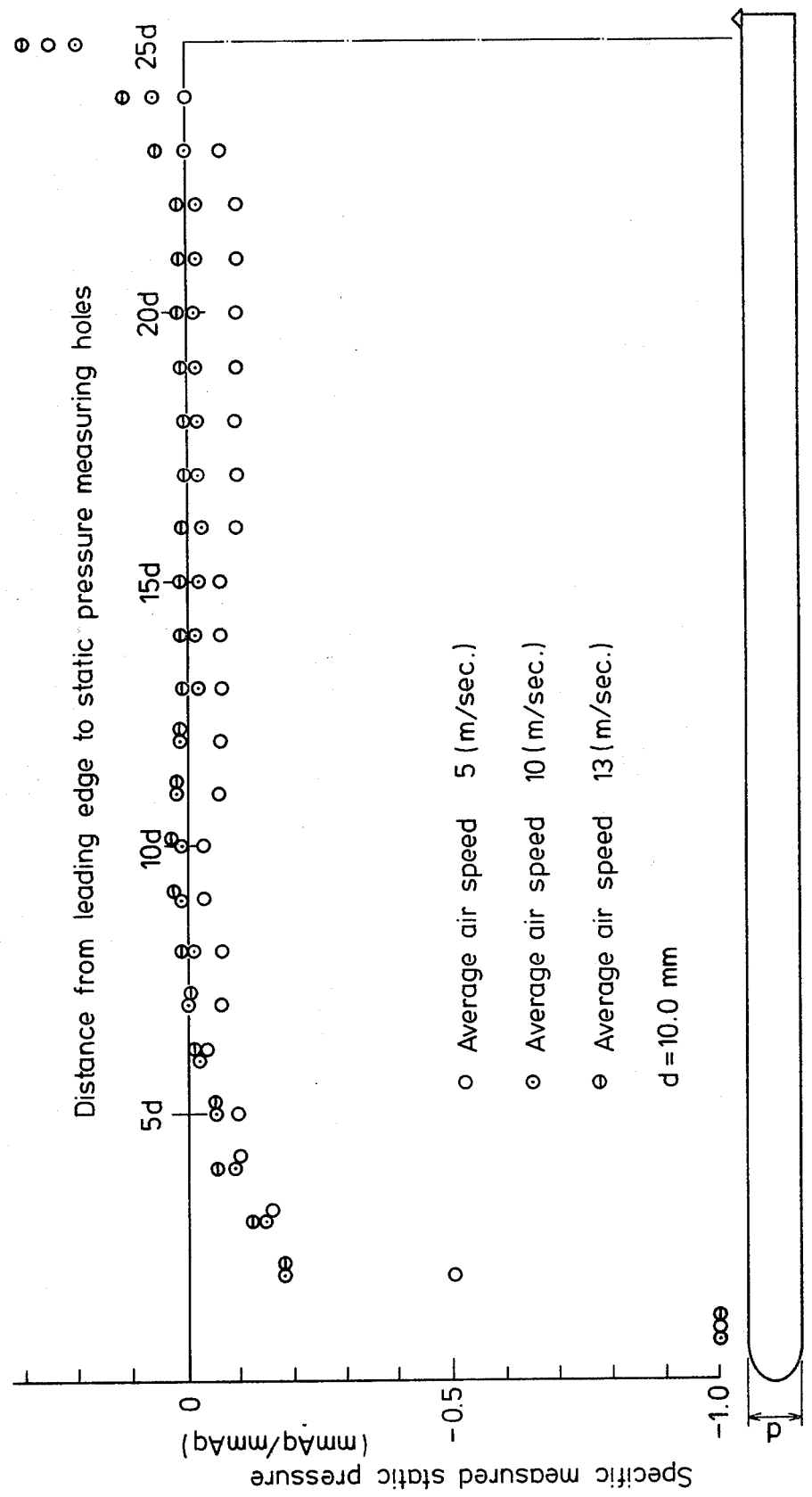
Figure 9:
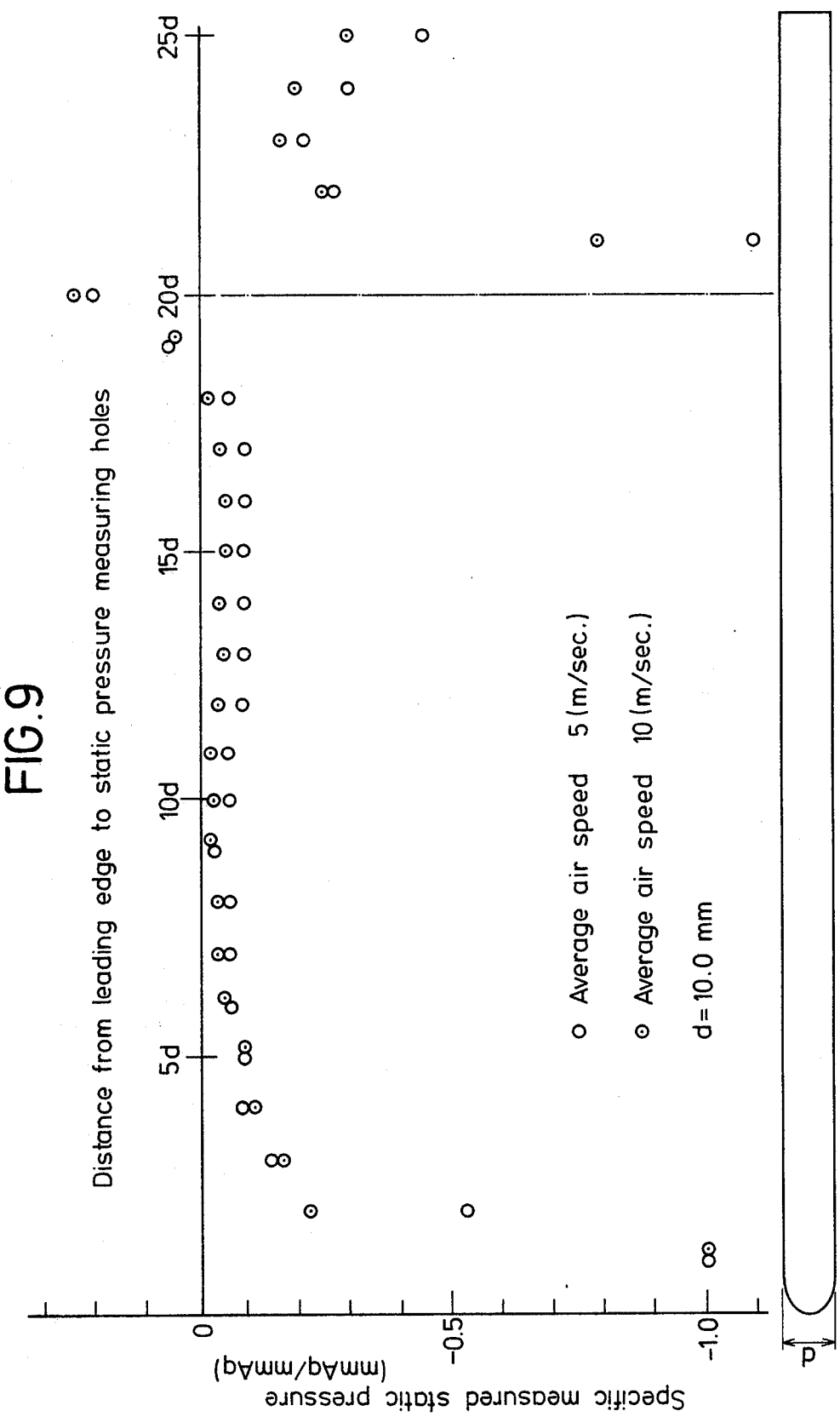

N, the distance from the leading edge of the fluid pressure sensor element 10 to the static pressure measuring holes 5, was an integral member of thicknesses d, and measurement was performed with respect to various positions of said static pressure measuring holes 5 corresponding to 1d to 25d. During the test procedure, the position of the ridge-like auxiliary member 8 for static pressure measuring was successively moved within a range defined between 25d and 20d from the leading edge of the fluid pressure sensor element 10. A ridge-like auxiliary member 8 for static pressure measuring having a projection height of approximately 2 mm was used. The duct included a linear duct portion and there was provided upstream of the fluid pressure sensor element 10 wire mesh of 8 meshes serving as the stream stabilizer 30. One mesh means one cross point of wires per linear inch. The results are illustrated in FIGS. 7-9, in which the measured values are normalized by −1.0 mm Aq/mmAq obtained in the static pressure measuring holes 5 located at the position of 1d and 0, ⊖, θ indicate the measured values at average air speeds of approximately 5 m/sec., 10 m/sec., 13 m/sec., respectively.

(2) A single fluid pressure sensor element 10 was mounted in the duct and measurement error was sought relative to the value obtained by the pitot tube to test a precision of this fluid pressure sensor element 10. Dimensions of the fluid pressure sensor element 10 used for this test procedure were as follows (respective reference letters have the same significance as in FIGS. 4 and 5):

| | |
|---|---|
| L = 280 mm | M = 84 mm |
| N = 60 mm | d = 10 mm |
| $P_1 = P_7 = 40$ mm | $P_2 = P_6 = 100$ mm |
| $P_3 = P_4 = P_5 = 0$ mm (absent) | |

Diameter of the total pressure measuring hole 4= ϕ 2 mm

Diameter of the static pressure measuring hole 5= ϕ 1 mm.

Here also the duct included a linear duct portion and there was provided upstream of the fluid pressure sensor element 10, wire mesh of 8 meshes serving as the stream stabilizer 30.

First, the results obtained as a function of the air speed but without provision of the ridge-like auxiliary member 8 for static pressure measuring are shown in Table 1.

TABLE 1

| Precision Test Results | | |
|---|---|---|
| Air Speed (measured by pitot tube) (m/sec.) | Air Speed (measured by fluid pressure sensor) (m/sec.) | Error Ratio (%) |
| 4.60 | 4.96 | +7.8 |
| 6.68 | 7.19 | +7.6 |
| 8.39 | 9.01 | +7.4 |
| 10.35 | 11.09 | +7.1 |
| 12.20 | 13.60 | +11.5 |
| 12.60 | 13.88 | +9.6 |

Next, the results obtained as a function of air speed and with provision of the ridge-like auxiliary member 8 for static pressure measuring is shown in Tables 2 through 4, of which Table 2 relates to the case wherein the ridge-like auxiliary member 8 for static pressure measuring was located approximately 5.0 mm (Q=5.0 mm in FIG. 5) downstream of the static pressure measuring holes 5 while Tables 3 and 4 respectively relate to the case wherein the auxiliary member 8 for static pressure measuring was located approximately 17.0 mm (Q=17.0 mm) downstream of said measuring holes 5 and the case wherein said auxiliary member 8 was located approximately 12.0 mm (Q=12.0 mm) downstream of said measuring holes 5. The ridge-like auxiliary member 8 itself had a projection height of approximately 2 mm.

TABLE 2

Precision Test Results

| Air Speed (measured by pitot tube) (m/sec.) | Air Speed (measured by fluid pressure sensor) (m/sec.) | Error Ratio (%) |
|---|---|---|
| 4.75 | 4.55 | −4.2 |
| 6.51 | 6.13 | −5.8 |
| 8.39 | 8.00 | −4.6 |
| 10.46 | 9.78 | −6.5 |
| 12.22 | 11.68 | −4.4 |
| 12.63 | 11.98 | −5.1 |

TABLE 3

Precision Test Results

| Air Speed (measured by pitot tube) (m/sec.) | Air Speed (measured by fluid pressure sensor) (m/sec.) | Error Ratio (%) |
|---|---|---|
| 4.72 | 4.83 | +2.3 |
| 6.56 | 6.63 | +1.1 |
| 8.39 | 8.55 | +1.9 |
| 10.46 | 10.73 | +2.6 |
| 12.12 | 12.74 | +5.1 |
| 12.68 | 13.04 | +2.8 |

TABLE 4

Precision Test Results

| Air Speed (measured by pitot tube) (m/sec.) | Air Speed (measured by fluid pressure sensor) (m/sec.) | Error Ratio (%) |
|---|---|---|
| 4.72 | 4.69 | −0.6 |
| 6.58 | 6.58 | 0 |
| 8.39 | 8.38 | −0.1 |
| 10.29 | 10.27 | −0.2 |
| 12.20 | 12.49 | +2.3 |
| 12.68 | 12.89 | +1.7 |

Figure 10:
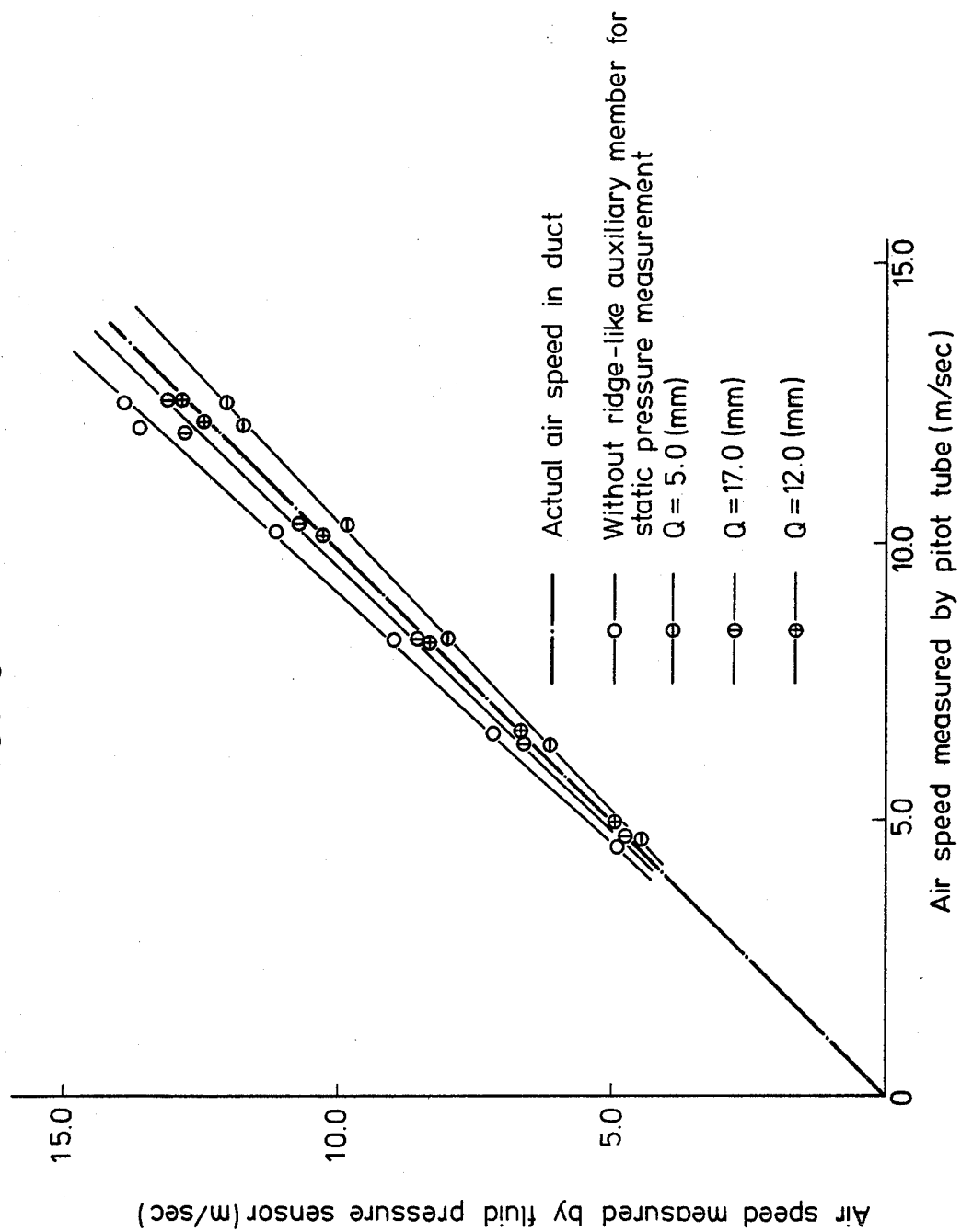

Measurement results shown in Tables 1 through 4 may be plotted down into a graphic chart of FIG. 10, in which a single-dotted chain line represents actual air speed in the duct. Of the these plotted curves a curve —O— corresponds to the case wherein there was not provided the ridge-like auxiliary member 8 for static pressure measuring, a curve —θ— corresponds to the case wherein the ridge-like auxiliary member 8 for static pressure measuring was mounted on the sensor element approximately 5.0 mm (Q=5.0 mm) downstream of the static pressure measuring holes 5, similarly, a curve —⊙— corresponds to the case wherein said auxiliary member 8 was located approximately 17.0 mm (Q=17.0 mm) and a curve —⊕— corresponds to the case wherein said member 8 was located approximately 12.0 mm (Q=12.0 mm), respectively, downstream of the static pressure measuring holes 5.

(3) In view of the fact that a plurality of the fluid pressure sensor elements 10 are usually incorporated in the duct at a practical field of operation, a pair of fluid pressure sensor elements 10 were incorporated into the duct vertically spaced about 100 mm from each other, and errors relative to the values measured by the pilot tube were sought to test the precision achieved by the fluid pressure sensor elements 10. Each of the fluid pressure sensor elements 10 used in this test procedure, had a ridge-like auxiliary member 8 with a height of 2 mm located approximately 12.0 mm (Q=12.0 mm) downstream of the static pressure measuring holes 5, this position having been shown to be the optimum position by the previous test procedure (2). The duct included a linear duct portion and there were provided wire meshes of 8 meshes serving as the stream stabilizers 30 upstream of the respective fluid pressure sensor elements 10.

Measurements obtained as a function of the air speed with the pair of fluid pressure sensor elements 10 communicating with each other is shown in Table 5.

To determine the influence of two adjacent fluid pressure sensor elements 10 upon static pressure measuring, measurements obtained by only one of these two fluid pressure sensor elements 10 is shown in Table 6. In this case also, measurement was performed for various air speeds.

TABLE 5

Precision Test Results

| Air Speed (measured by pitot tube) (m/sec.) | Air Speed (measured by fluid pressure sensor) (m/sec.) | Error Ratio (%) |
|---|---|---|
| 4.84 | 5.02 | +3.7 |
| 6.59 | 6.85 | +3.9 |
| 8.46 | 8.77 | +3.7 |
| 10.18 | 10.61 | +4.2 |
| 12.13 | 12.89 | +6.3 |
| 12.50 | 13.24 | +5.9 |

TABLE 6

Precision Test Results

| Air Speed (measured by pitot tube) (m/sec.) | Air Speed (measured by fluid pressure sensor) (m/sec.) | Error Ratio (%) |
|---|---|---|
| 4.64 | 4.86 | +4.7 |
| 6.64 | 6.92 | +4.2 |
| 8.52 | 8.88 | +4.2 |
| 10.40 | 10.84 | +4.2 |
| 12.11 | 12.94 | +6.9 |
| 12.46 | 13.17 | +5.7 |

Figure 11:
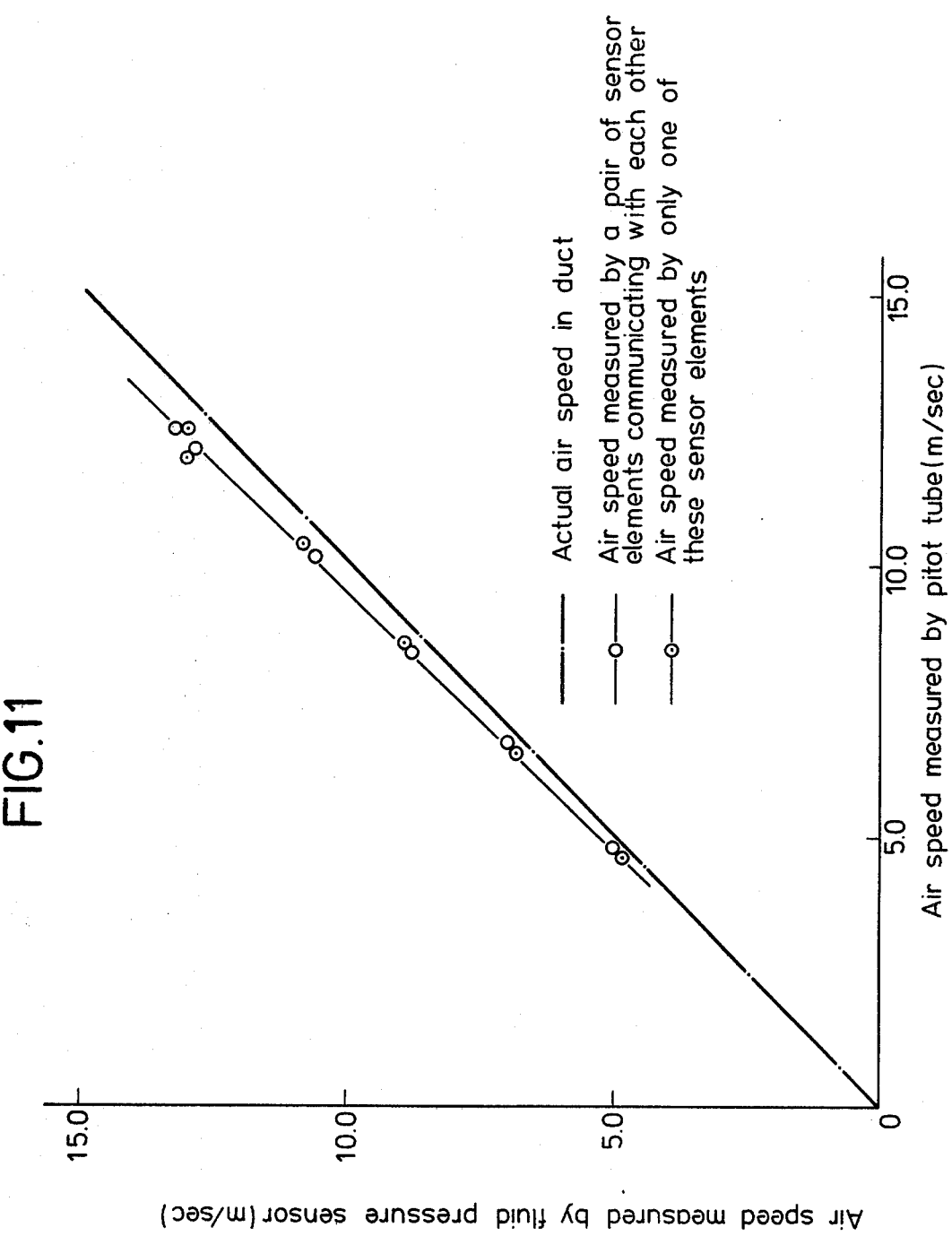

Measurement results shown in Tables 5 and 6 are plotted down into a graphic chart of FIG. 11, in which a single-dotted chain line indicates the actual air speed in the duct and the curves –O– and –⊙– indicate the air speed measured with a pair of fluid pressure sensor elements 10 communicating with each other and the air speed measured only by the one element 10, respectively.

(4) In view of the fact that it may be often necessary in the practial field of operation to install the fluid pressure sensor element 10, not downstream of the linear duct portion but immediately behind the bent duct portion, measurement error was sought with respect to the value obtained by the pitot tube and the precision of said sensor element was studied. The fluid pressure sensor element 10 used in this test procedure included the ridge-like auxiliary member 8 for static pressure measuring having a projection height of approximately damper means 22, with the air speed varying, and wherein the blade 24 of the damper means 22 extends parallel to the associated fluid pressure sensor element 10. The damper shaft 23 was spaced approximately 310 mm (R=310 mm in FIG. 6) from the leading edge of the fluid pressure sensor element 10 in one measurement, and approximately 230 mm (R=230 mm) from the leading edge of the fluid pressure sensor element 10, in a second measurement. A third measurement was made wherein the blade 24 of the damper means 22 extended perpendicular to the fluid pressure element 10 and the damper shaft 23 was spaced approximately 230 mm (R=230 mm) from the leading edge of the fluid pressure sensor element 10.

Measurements obtained in the case wherein the blade 24 of the damper means extends in parallel to the associated fuid pressure sensor element 10 and the damper shaft 23 is spaced approximately 310 mm (R=310 mm) are shown in Table 8.

TABLE 8

Damper's State versus Precision

| Damper's State | Air Speed (measured by pitot tube) (m/sec.) | Air Speed (measured by fluid pressure sensor) (m/sec.) | Error Ratio (%) |
|---|---|---|---|
| Open | 9.12 | 9.38 | +2.9 |
| ↓ | 8.87 | 9.13 | +2.9 |
| ↓ | 8.12 | 8.28 | +2.0 |
| ↓ | 7.14 | 7.24 | +1.4 |
| ↓ | 6.16 | 6.26 | +1.6 |
| ↓ | 5.47 | 5.54 | +1.3 |
| ↓ | 4.41 | 4.41 | 0 |
| Closed | 3.25 | 3.22 | −0.9 |

Measurements obtained in the case wherein the blade 24 of the damper means 22 extends parallel to the associated fluid pressure sensor element 10 and the damper shaft 23 is spaced approximately 230 mm (R=230 mm) from the leading edge of the fluid pressure sensor element 10 are shown in Table 9.

TABLE 9

Damper's State versus Precision

| Damper's State | Air Speed (measured by pitot tube) (m/sec.) | Air Speed (measured by fluid pressure sensor) (m/sec.) | Error Ratio (%) |
|---|---|---|---|
| Open | 9.15 | 9.41 | +2.8 |
| ↓ | 8.39 | 8.66 | +3.2 |
| ↓ | 7.33 | 7.59 | +3.5 |
| ↓ | 6.14 | 6.33 | +3.1 |
| ↓ | 5.16 | 5.33 | +3.3 |
| Closed | 3.61 | 3.69 | +2.2 |

Measurements obtained in the case wherein the blade 24 of the damper means 22 extends perpendicularly to the fluid pressure sensor element 10 and the damper shaft 23 is spaced approximately 230 mm (R=230 mm) from the leading edge of the fluid pressure sensor element 10 are shown in Table 10.

TABLE 10

Damper's State versus Precision

| Damper's State | Air Speed (measured by pitot tube) (m/sec.) | Air Speed (measured by fluid pressure sensor) (m/sec.) | Error Ratio (%) |
|---|---|---|---|
| Open | 9.15 | 9.45 | +3.3 |

TABLE 10-continued

Damper's State versus Precision

| Damper's State | Air Speed (measured by pitot tube) (m/sec.) | Air Speed (measured by fluid pressure sensor) (m/sec.) | Error Ratio (%) |
|---|---|---|---|
| ↓ | 8.26 | 8.36 | +1.2 |
| ↓ | 7.22 | 7.28 | +0.8 |
| ↓ | 6.43 | 6.43 | 0 |
| ↓ | 5.40 | 5.40 | 0 |
| ↓ | 4.65 | 4.62 | −0.6 |
| Closed | 3.53 | 3.46 | −2.0 |

Figure 16:
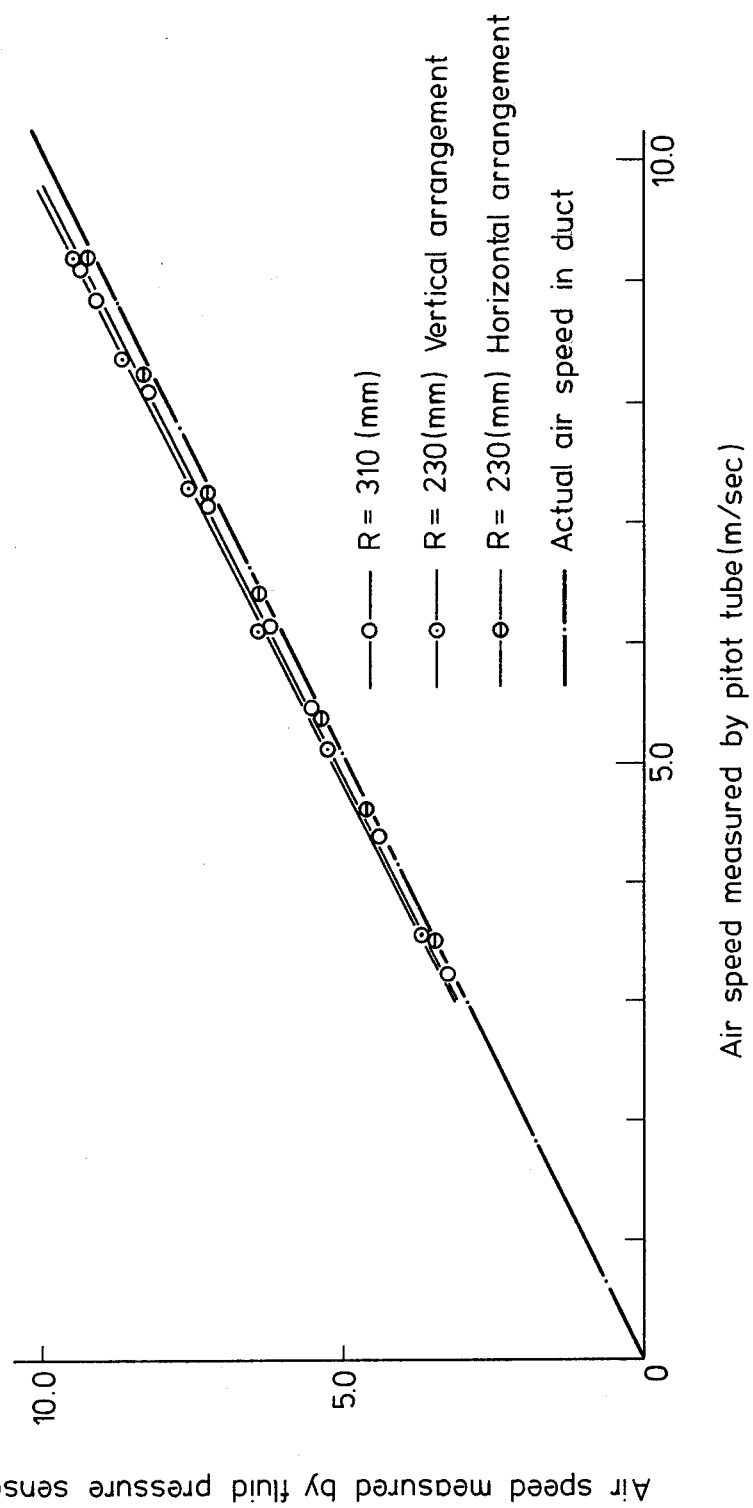

The measurements shown in Tables 8 through 10 were plotted on the graphic chart in FIG. 16, in which a single-dotted chain line indicates the actual air speed in the duct, —O— indicates the measurement value obtained with the damper blade extending in parallel to the fluid pressure sensor element and the damper shaft spaced approximately 310 mm (R=310 mm) from the leading edge of the fluid pressure sensor element,—⊙— indicates the measurement value obtained with the damper blade extending perpendicularly to the fluid pressure sensor element and with the damper shaft spaced approximately 230 mm (R=230 mm) from the leading edge of the fluid pressure sensor element, and —θ— indicates the measurement value obtained with the damper blade extending parallel to the fluid pressure sensor element and with the damper shaft spaced approximately 230 mm (R=230 mm) from the leading edge of the fluid pressure sensor element.

(7) Assuming a practical field of operation, the fluid pressure sensor elements 10 were installed immediately behind the bent portion of the duct and possible error was sought relative to the value obtained by the pitot tube to examine the precision achieved by the fluid pressure sensor element according to the present invention. The fluid pressure sensor element 10 actually used for this test procedure was identical to that used for the previously mentioned test procedure (6). The bent portion of the duct curved from the vertical to the horizontal. The test procedure was conducted with the fluid pressure sensor elements 10 horizontally arranged parallel to one another in one case and with the fluid pressure sensor elements 10 vertically arranged parallel to one another in another case. Upstream of each fluid pressure sensor element 10 there is provided wire mesh of 10 meshes serving as the stream stabilizer 30. In all cases, there was provided the damper means 22 downstream of each fluid pressure sensor element 10 with the blade 24 of said damper means 22 extending in parallel to the associated fluid pressure sensor element 10 and the test procedure was conducted at various opening degrees of the damper means 22 and with the air speed varying.

The measurement result obtained with the fluid pressure sensor elements 10 horizontally arranged is shown in Table 11 while the measurement result obtained with the fluid pressure sensor elements 10 vertically arranged is shown in Table 12.

2 mm and located approximately 12.0 mm (Q=12.0 mm) downstream of the static pressure measuring holes 5. As seen in FIG. 6, there was provided wire mesh of 10 meshes serving as the stream stabilizer 30 upstream of the fluid pressure sensor element and damper means 22 downstream of said sensor element, of which the opening degree was controlled to change the air speed. Results are shown in Table 7.

TABLE 7

Precision Test Results

| Damper's Opening Degree (Deg) | Air Speed (measured by pitot tube) (m/sec.) | Air Speed (measured by fluid pressure sensor) (m/sec.) | Error Ratio (%) |
| --- | --- | --- | --- |
| 0 | 13.57 | 13.98 | +3.0 |
| 10 | 13.10 | 13.26 | +1.2 |
| 20 | 11.63 | 11.79 | +1.4 |
| 30 | 9.01 | 9.31 | +3.3 |
| 40 | 6.89 | 6.97 | +1.2 |
| 50 | 5.08 | 5.09 | +0.2 |
| 60 | 3.39 | 3.41 | +0.6 |
| 70 | 2.14 | 2.13 | −0.5 |
| 80 | 1.07 | 1.14 | +6.5 |

Figure 12:
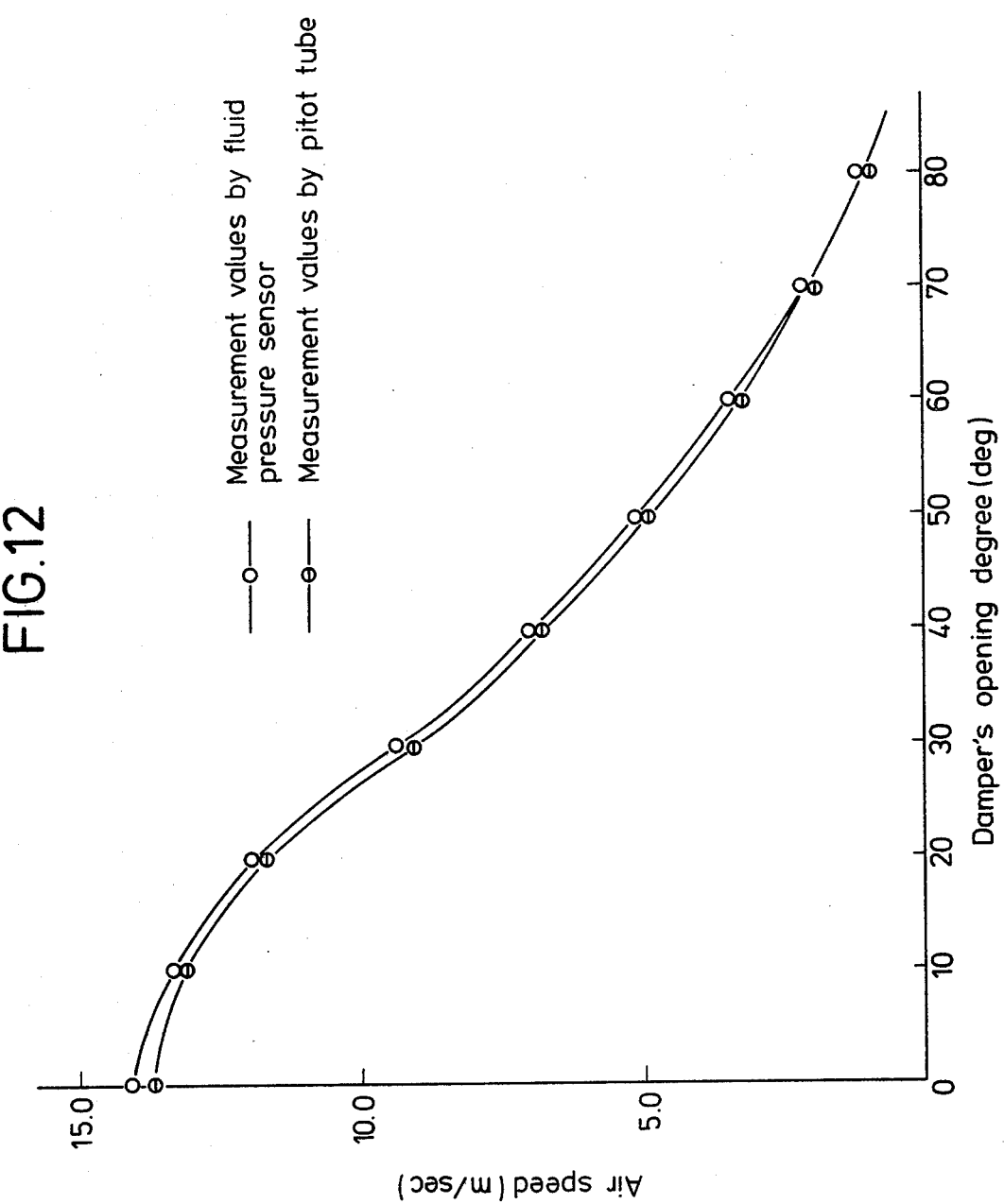
Figure 13:
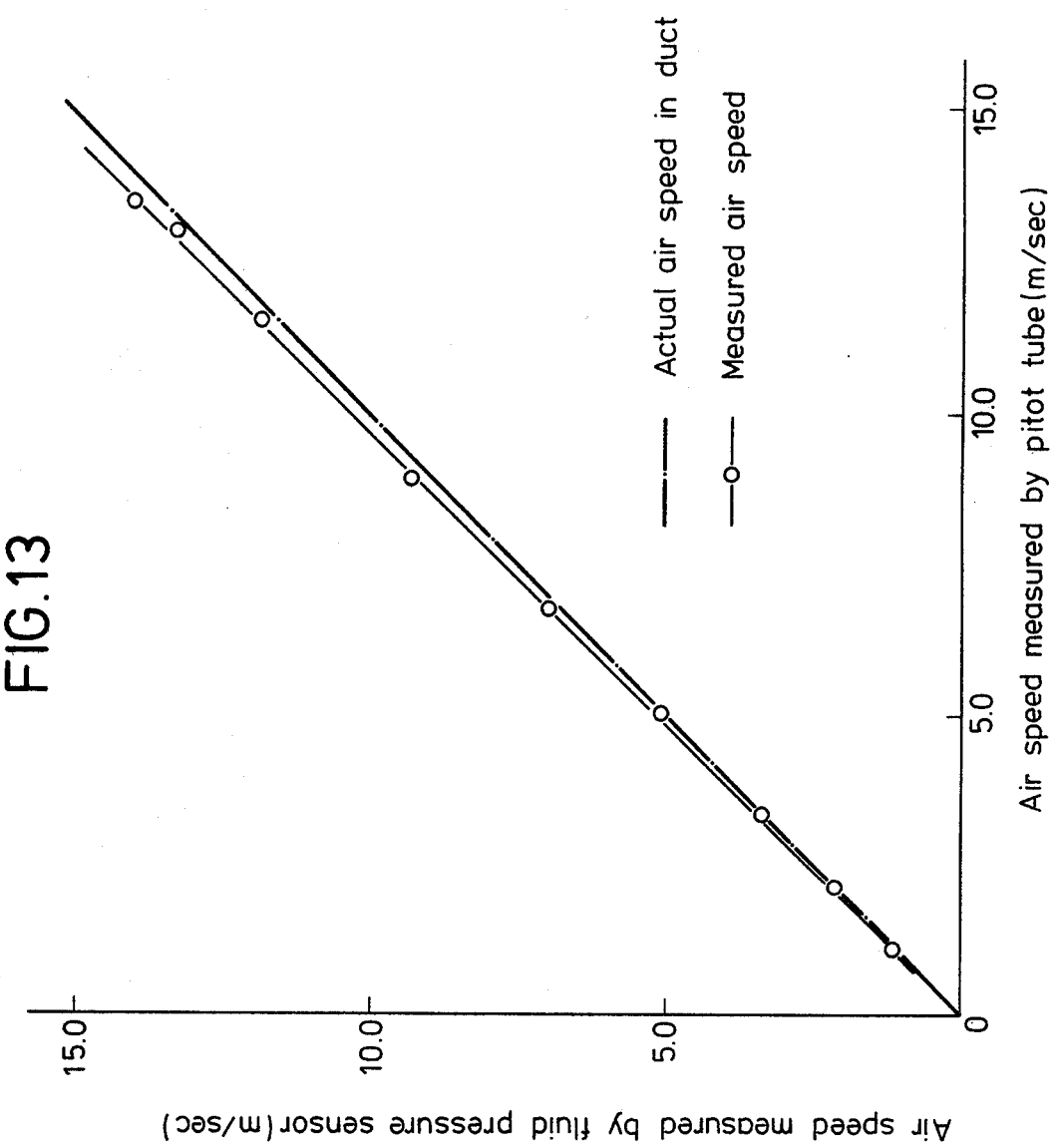

The change in air speed as a function of the opening degree of the damper 22 is shown in FIG. 12 on the basis of values obtained by the pitot tube and the fluid pressure sensor element 10, respectively, in which —0— indicates the measurement value obtained by the fluid pressure sensor element 10 while —θ— indicates the measurement value obtained by the pitot tube. FIG. 13 illustrates the comparison of the values of Table 7 with the actual air speed with respect to respective precisions. In FIG. 13, a single-dotted chain line represents the actual air speed in the duct while —0— represents the measurement value thereof.

Although the previously mentioned test procedures (1) through (4) were conducted in a duct having a dimension of 300×200 mm, the following test procedures were conducted in a ducting of 500×500 mm, since the ducts of various dimensions are often used in the field of operation in practice.

(5) Five of said fluid pressure sensor elements 10 were installed in the duct to determine how the measurement of static pressure values obtained from the respective fluid pressure sensor elements 10 are possibly influenced by the respective adjacent sensor elements 10. More specifically, comparative tests were conducted in the case wherein the static pressure was measured by any one of these five sensor elements 10 and in the case wherein the static pressure was measured by the single sensor element independently installed in the duct.

In each case, the dimensions of each fluid pressure sensor element 10 used for measurement were as follows: (reference letters have the same significances as in FIGS. 4 and 5):

L = 494 mm  M = 254 mm
d = 10 mm  $P_1 = P_7$ = 42 mm
$P_2 = P_3 = P_4 = P_5 = P_6$ = 82 mm

Diameter of static pressure measuring hole 5 = ⌀ 1 mm. N, the distance from the leading edge to the static pressure measuring holes 5 of the fluid pressure sensor element 10 was an integral number of the thickness d and measurements were performed with respect to the positions 1d to 25d.

In the case where five of the fluid pressure sensor elements 10 were installed, these sensor elements were arranged parallel to each other, and the elements at opposite ends were spaced approximately 50 mm from the adjacent inner walls of the duct while the other sensor elements were spaced approximately 100 mm from each other.

In both the case where five of the sensor elements were installed and the case where a single one of the sensor elements was installed, there was provided the desired length of linear duct portion and wire mesh of 10 meshes was arranged upstream of the fluid pressure sensor element 10 as the stream stabilizer 30.

Figure 14:
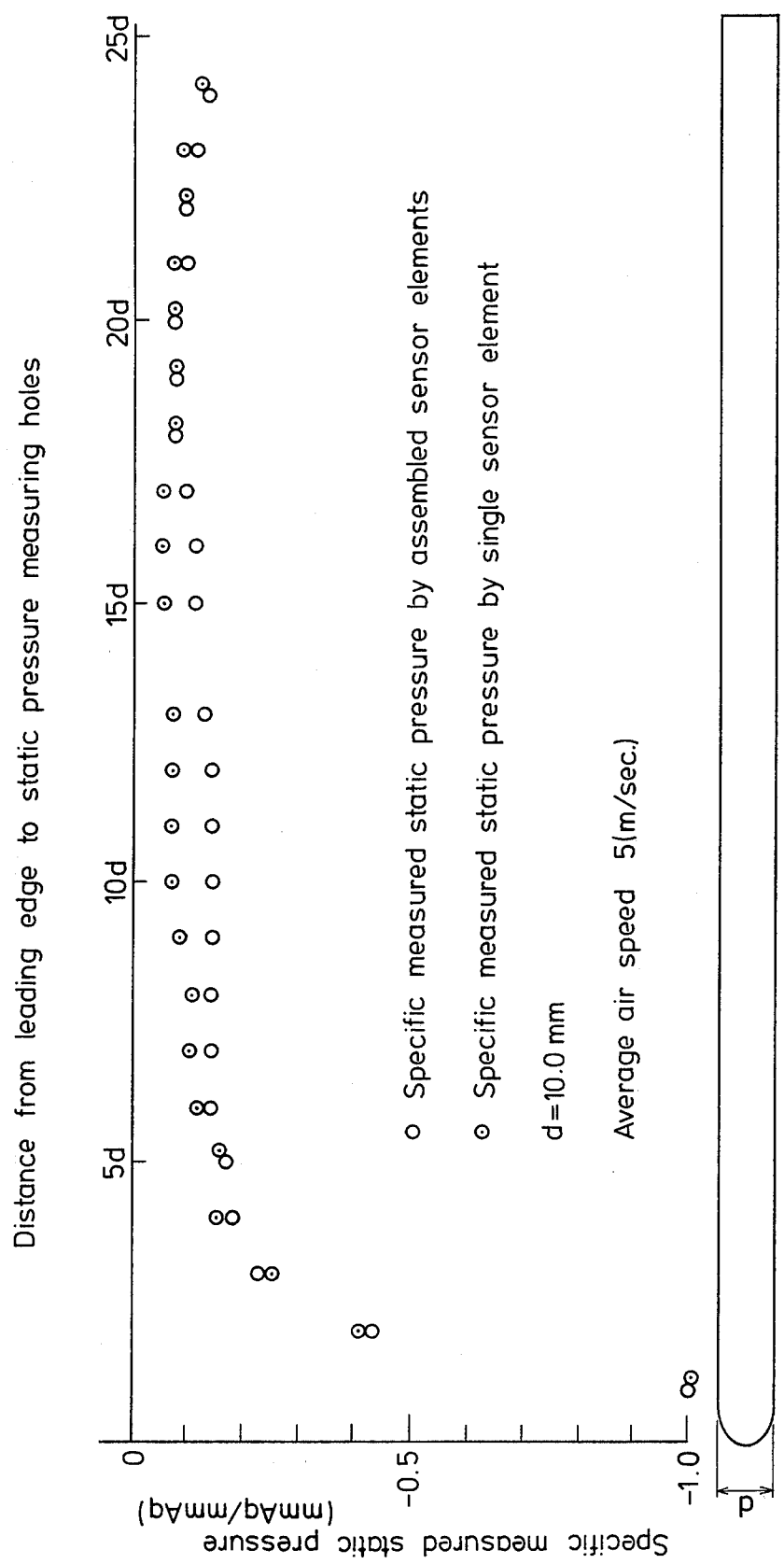
Figure 15:
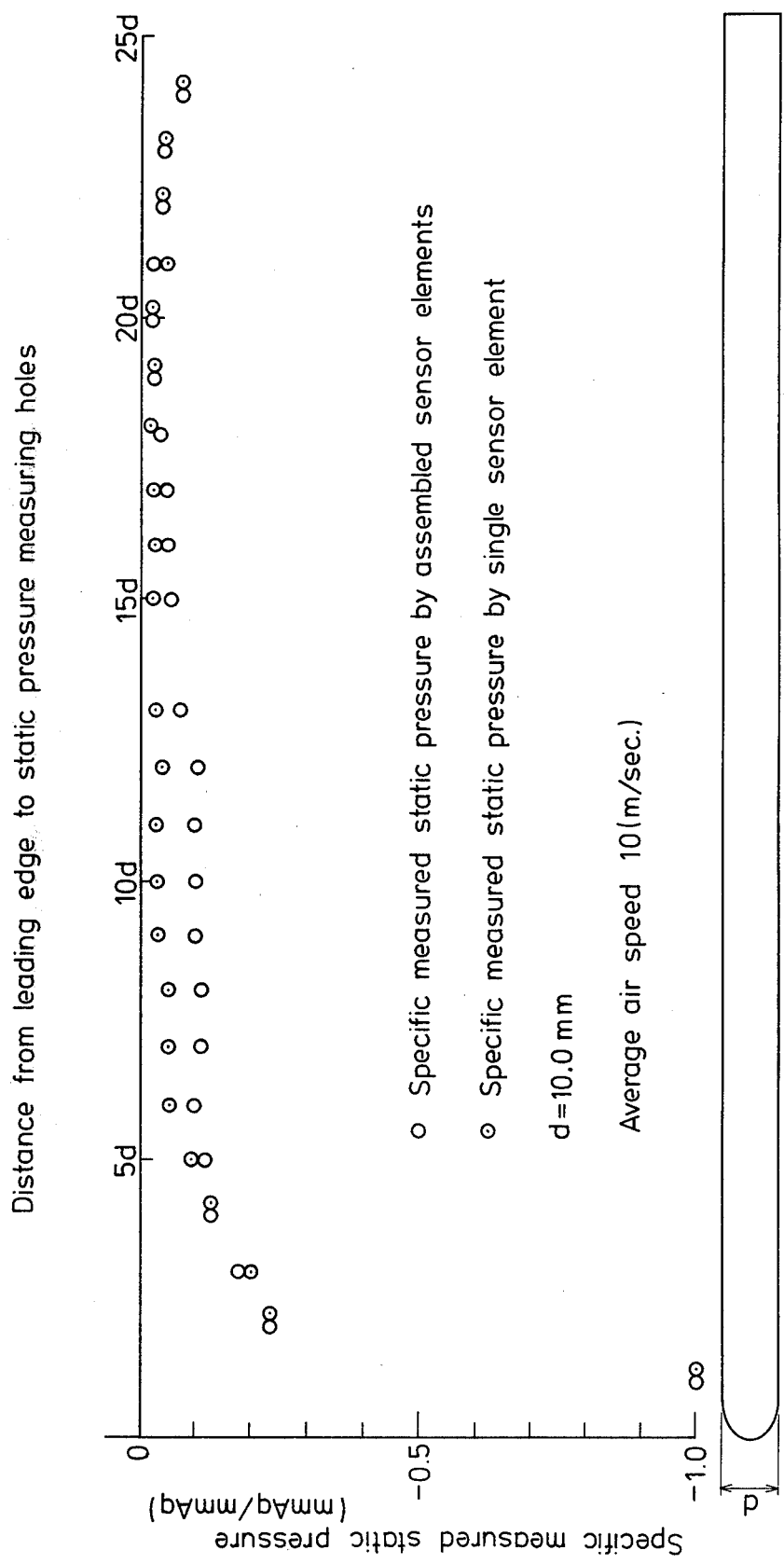

The test was conducted at average air speeds in the duct of approximately 5 m/sec. and 10 m/sec., measurements, obtained at the former air speed being shown in FIG. 14 and measurements obtained at the latter air speed being shown in FIG. 15. In both figures, the measurement value at the static pressure measuring holes 5 located at the position of 1d is normalized by −1.0 mm Aq/mm Aq and —0— indicates the value measured by any one of five sensor elements while—⊙— indicates the value measured by the single sensor element independently installed in the duct.

(6) Five of the fluid pressure sensor elements 10 were installed in the duct and possible error compared to the measurement value by the pitot tube was sought to examine the precision of the fluid pressure sensor element according to the present invention. Dimensions of the fluid pressure sensor element 10 actually used for this test procedure were as follows (reference letters have the same significances as in FIGS. 4 and 5):

L = 494 mm  M = 105 mm
N = 45 mm  d = 10 mm
$P_1 = P_7$ = 42 mm
$P_2 = P_3 = P_4 = P_5 = P_6$ = 82 mm

Diameter of the total pressure measuring hole 4 = ⌀ 2 mm

Diameter of the static pressure measuring hole 5 = ⌀ 1 mm. The ridge-like auxiliary member 8 for static pressure measurement was located approximately 7 mm downstream of the static pressure measuring holes 5 and had a projection height of approximately 2 mm. N, the distance from the leading edge of the fluid pressure sensor element 10 to the static pressure measuring holes 5 was set to the optimum distance (N=4.5d=45 mm) at which the static pressure measured by the particular one of the fluid pressure sensor elements 10 is influenced by the leading edge of the fluid pressure sensor element 10 as well as by the adjacent fluid pressure sensor element 10 at the minimum as it is proved on the basis of the measurement result obtained in the test procedure (5).

Installation of five fluid pressure sensor elements 10 was accomplished by arranging them parallel with each other within the duct, the sensor elements located at opposite ends being spaced approximately 50 mm from the associated inner walls and the other sensor elements 10 being spaced approximately 100 mm from each other. As seen in FIG. 6, wire mesh of 10 meshes was located in front of each fluid pressure sensor element 10 as the stream stabilizer 30 and each blade 24 of the damper means 22 was associated with each fluid pressure sensor element 10. In this test procedure, measurement was made at various degrees of opening of the

TABLE 11

Precision Immediately Behind Bent Portion

| Damper's State | Air Speed (measured by pitot tube) (m/sec.) | Air Speed (measured by fluid pressure sensor) (m/sec.) | Error Ratio (%) |
|---|---|---|---|
| Open | 9.54 | 8.12 | −14.9 |
| ↓ | 8.29 | 7.15 | −13.8 |
| ↓ | 7.33 | 6.33 | −13.6 |
| ↓ | 6.49 | 5.80 | −10.6 |
| ↓ | 5.42 | 4.89 | −9.8 |
| ↓ | 4.59 | 4.10 | −10.7 |
| Closed | 3.87 | 3.55 | −8.3 |

TABLE 12

Precision Immediately Behind Bent Portion

| Damper's State | Air Speed (measured by pitot tube) (m/sec.) | Air Speed (measured by fluid pressure sensor) (m/sec.) | Error Ratio (%) |
|---|---|---|---|
| Open | 9.48 | 9.75 | +2.8 |
| ↓ | 8.39 | 8.59 | +2.4 |
| ↓ | 7.33 | 7.46 | +1.8 |
| ↓ | 6.38 | 6.58 | +3.1 |
| ↓ | 5.42 | 5.72 | +5.5 |
| ↓ | 4.56 | 4.79 | +5.0 |
| Closed | 3.65 | 3.69 | +1.1 |

Figure 17:
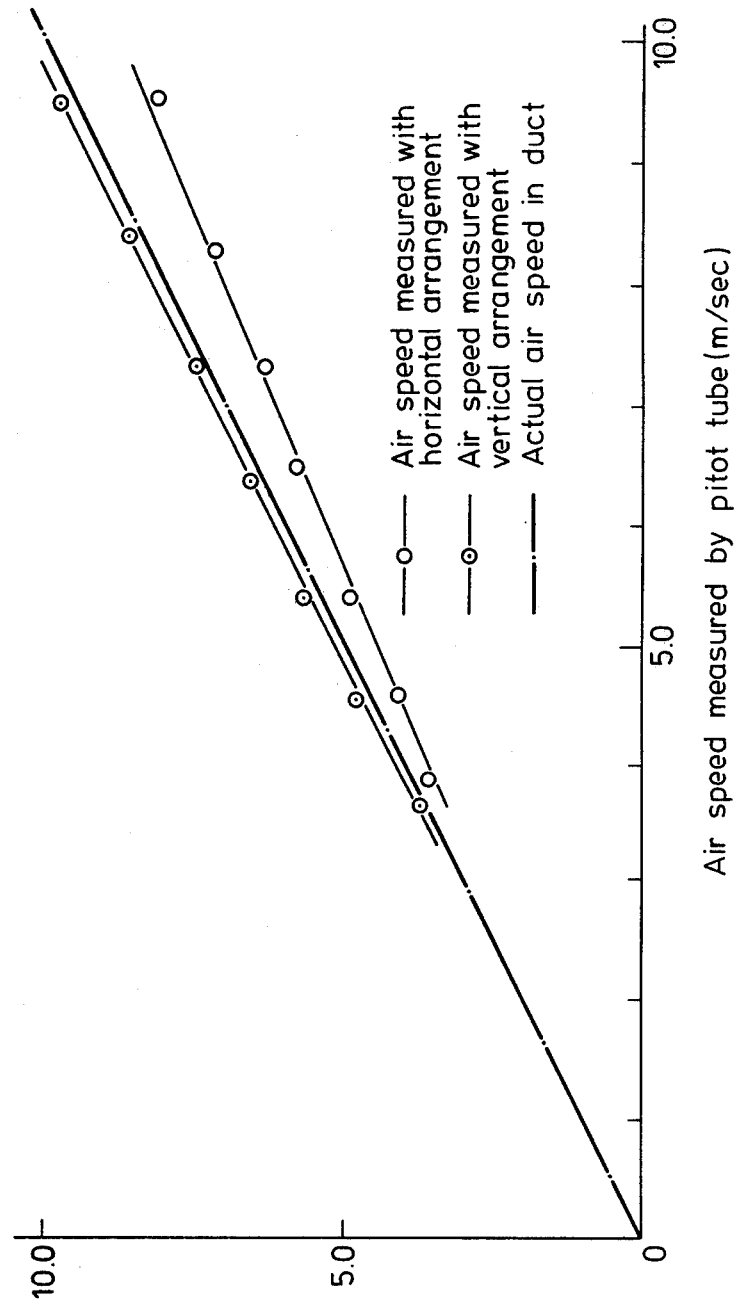

The measurement values shown in Tables 11 and 12 were plotted into a graphic chart as seen in FIG. 17, in which a single-dotted chain line indicates the actual air speed in the duct, —0— indicates the measurement value obtained with the fluid pressure sensor elements 10 horizontally arranged, and −⊙− indicates the measurement value obtained with the fliuid pressure sensor elements 10 vertically arranged.

Said test procedures (6) and (7) were conducted with the length M in the flow direction of 105 mm. In view of the fact that such length M may be further reduced to reduce the space for apparatus installation and also to reduce the possible influence of interference among the adjacent fluid pressure sensor elements 10, the following test procedures were conducted with said length being further reduced.

(8) With five fluid pressure sensor elements 10 horizontally arranged in parallel to one another and the damper means 22 provided downstream thereof, error was sought relative to the measurement value obtained by the pitot tube at various opening degrees of said damper means 22 and the air speed correspondingly varying to examine the precision of the fluid pressure sensor elements. Dimensions of the fluid pressure sensor element used for this test procedure were as follows (reference letters have the same significance as in FIGS. 4 and 5):

| | |
|---|---|
| L = 494 mm | M = 59 mm |
| N = 45 mm | d = 10 mm |
| $P_1 = P_7 = 42$ mm | |
| $P_2 = P_3 = P_4 = P_5 = P_6 = 82$ mm | |

Diameter of the total pressure measuring holes 4 = ɸ 2 mm

Dimeter of the static pressure measuring holes 5 = ɸ 1 mm.

The ridge-like auxiliary member 8, for static pressure measuring, was provided approximately 7.0 mm downstream of the static pressure measuring holes 5 and has a projection height of approximately 2 mm.

Figure 18:
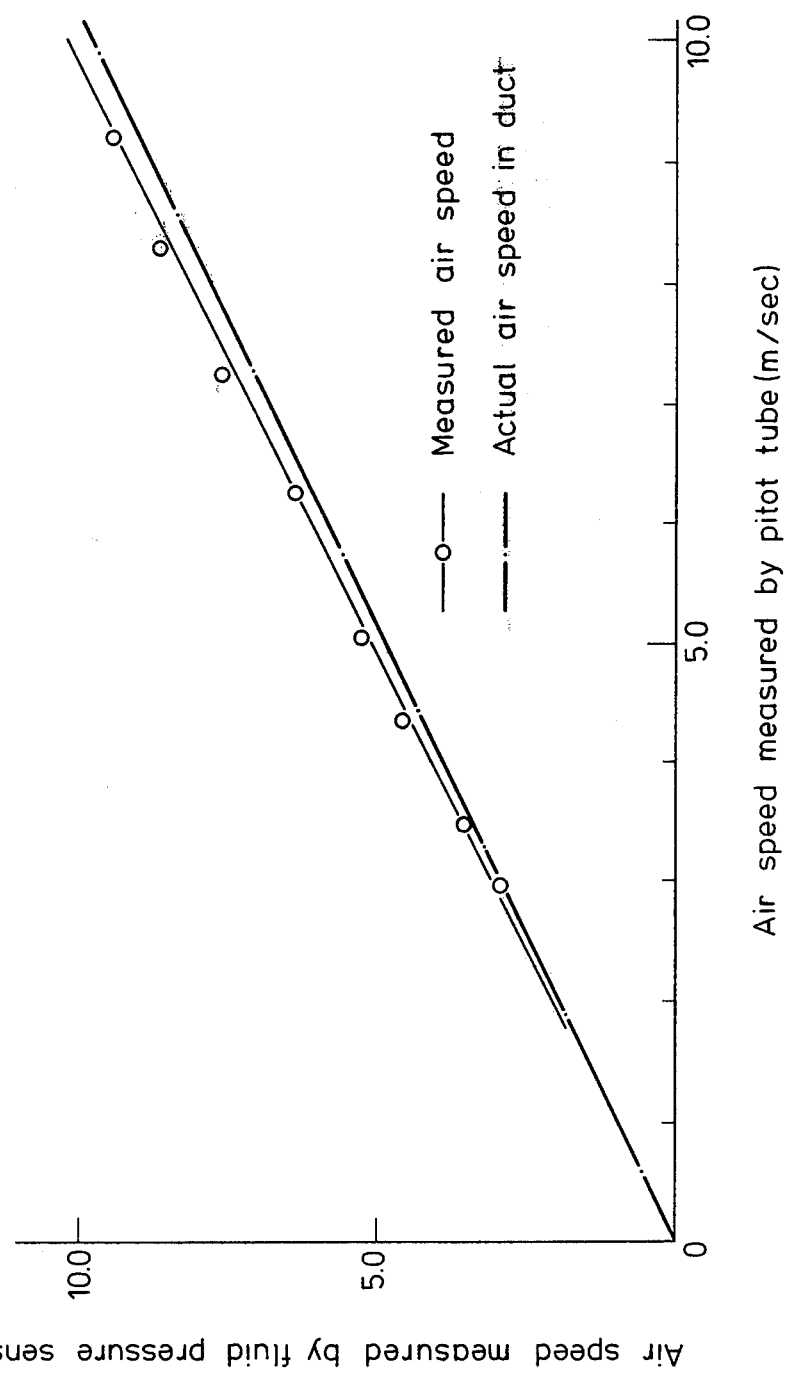

The measurement results are shown in Table 13 and plotted into a graphic chart as seen in FIG. 18.

TABLE 13

Precision Test Results

| Damper's State | Air Speed (measured by pitot tube) (m/sec.) | Air Speed (measured by fluid pressure sensor) (m/sec.) | Error Ratio (%) |
|---|---|---|---|
| Open | 9.21 | 9.55 | +3.7 |
| ↓ | 8.29 | 8.74 | +5.4 |
| ↓ | 7.26 | 7.65 | +5.4 |
| ↓ | 6.27 | 6.46 | +3.0 |
| ↓ | 5.05 | 5.33 | +5.5 |
| ↓ | 4.34 | 4.62 | +6.5 |
| ↓ | 3.45 | 3.60 | +4.2 |
| Closed | 2.98 | 3.01 | +1.0 |

(9) With the fluid pressure sensor elements 10 used in the previously mentioned test procedure (8) installed immediately behind the bent portion of the duct, error was sought relative to the measurement obtained by the pitot tube at various opening degrees of the damper means 22 located downstream of said fluid pressure sensor elements 10 with the air speed correspondingly varying to examine the precision of the fliuid pressure sensor element according to the present invention. Installation of the fluid pressure sensor elements 10 was accomplished by vertically arranging these fluid pressure sensor elements 10 parallel with one another immediately behind the duct portion bending from the vertical to the horizontal.

Figure 19:
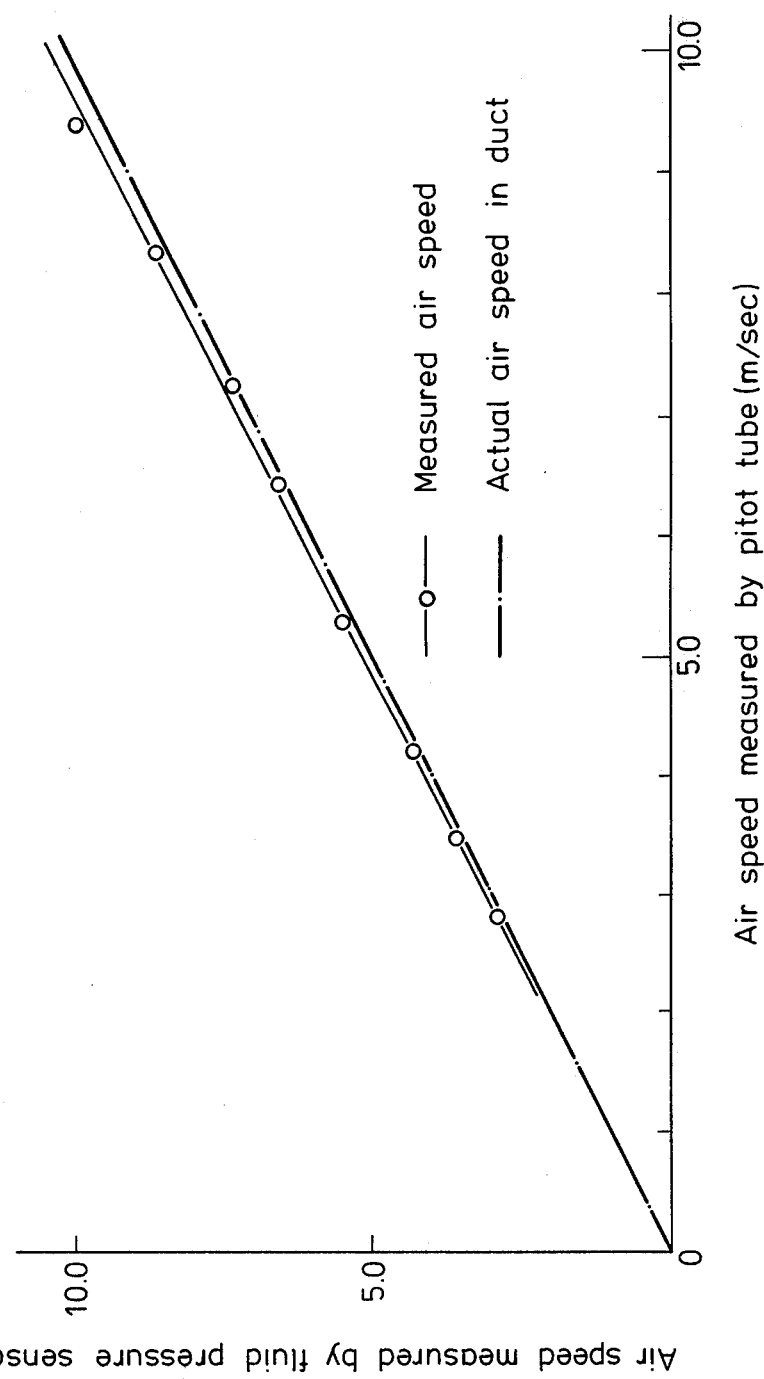

The measurements obtained with this arrangement are shown in Table 14 and are plotted in the graphic chart of FIG. 19, in which a single-dotted chain line indicates the actual air speed in the duct and —0— indicates the measurement value.

TABLE 14

Precision Test Result

| Damper's State | Air Speed (measured by pitot tube) (m/sec.) | Air Speed (measured by fluid pressure sensor) (m/sec.) | Error Ratio (%) |
|---|---|---|---|
| Open | 9.45 | 9.82 | +3.9 |
| ↓ | 8.39 | 8.51 | +1.4 |
| ↓ | 7.30 | 7.28 | −0.3 |
| ↓ | 6.47 | 6.53 | +0.9 |
| ↓ | 5.32 | 5.45 | +2.4 |
| ↓ | 4.21 | 4.29 | +1.9 |
| ↓ | 3.49 | 3.51 | +0.6 |
| Closed | 2.84 | 2.84 | 0 |

From the tests as have been described above, it was determined that the ridge-like auxiliary member 8 permits the length of the individual fluid pressure sensor element, measured in the flow direction, to be shorter than in the case of the sensor element without this ridge-like auxiliary member 8, as seen in FIGS. 7-9. It was also determined that the fluid pressure sensor element 10 with a ridge-like auxiliary member having an adequate downstream portion of said fluid pressure sensor element behind the ridge-like auxiliary member, free from the influence on the measured static pressure value when compared with the fluid pressure sensor element having such ridge-like auxiliary member but with a trailing portion behind said ridge-like auxiliary member which is inadequate.

As seen in FIG. 16, the measured pressure value is not remarkably influenced even when the damper means 22 is arranged close to the fluid pressure sensor element 10, as long as the damper means 22 is located downstream of said fluid pressure sensor element 10.

It should be understood that it will be possible to improve the precision with which the pressure can be measured, as this is suggested by the various test procedures for examintion of the precision, when there are provided suitable modifications of factors such as the length of the fluid pressure sensor element 10 as measured in the flow direction, the position of the static pressure measuring holes 5 and the position of the ridge-like auxiliary member 8 for static pressure measurement.

In the test procedures as have been described above, the number of the fluid pressure sensor elements 10 installed in the duct and the pitches of the total pressure measuring holes 4 and the static pressure measuring holes 5, respectively, were selected according to the testing standard JIS B 8330. It will be understood that the measurement precision can be further improved when the duct cross-sectional area is more finely divided.

Additionally, the stream stabilizing effect can be also improved by using, as the stream stabilizer 30, wire mesh not of 8 or 10 meshes but more fine meshes. Such wire mesh may be replaced by other means such as a fillet or a straightening vane. Although the ridge-like auxiliary member 8 for static pressure measuremenet having a projection height of approximately 2 mm was employed in the test procedures, the projection height is not limited to this value.

As is apparent from the foregoing description, the fluid pressure sensing apparatus according to the present invention consists of at least one fluid pressure sensor element comprising a flat hollow structure presenting a narrow edge to a fluid flowing through a duct, the interior of this hollow structure being divided into two chambers, an upstream chamber and a downstream chamber, so that the average total pressure may be measured from said upstream chamber while an average static pressure may be measured from the downstream chamber. This feature permits a simplified construction to be provided at a low cost and high precision measurements to be obtained even when the apparatus is installed immediately behind a bent portion of a duct. Furthermore, provision of a ridge-like auxiliary member for static pressure measurement downstream of static pressure measuring holes permits the individual fluid pressure sensor element to be reduced in the length along the flow direction. Consequently, the space necessary for installation of the apparatus in the field of operation, such as an air conditioning equipment room, is remarkably reduced and the effective precision can be maintained even when the apparatus is installed immediately behind the bent portion of the duct.

In FIGS. 7, 8, 9, 14 and 15, the pressures have been normalized by comparing the static pressure measured for the holes at various distances from the leading edge, with the static pressure at 1$d$ from the leading edge. The ordinates of these Figures are, therefore, dimensionless.

FIG. 7 shows the values of static pressure where the fluid pressure sensor does not have a ridge-like auxiliary member. FIGS. 8 and 9 shows values where the ridge-like auxiliary member is located at 25$d$ and 20$d$, respectively, from the leading edge.

What is claimed is:

1. A fluid pressure sensing apparatus comprising at least one fluid pressure sensor element, said fluid pressure sensor element comprising:
   a flat hollow structure adapted to extend transverse to the direction in which a fluid flows through a duct, said hollow structure having therein a partition which extends transverse to the flow direction so as to divide the interior of the hollow structure into an upstream chamber and a downstream chamber, a plurality of total pressure measuring holes which extend through an upstream end wall of the hollow structure in the flow direction so that the upstream chamber of the hollow structure is open through said total pressure measuring holes, a plurality of static pressure measuring holes extending transversely to the flow direction through at least one wall of said hollow structure which extends parallel to the flow direction, so that said downstream chamber of said hollow structure is open through said static pressure measuring holes, wherein the total pressure may be measured from the upstream chamber and the static pressure may be measured from the downstream chamber of said hollow structure, and pressure outlets formed for the respective chambers and connected by respective connector pipes to associated measuring instruments,
   and further comprising a ridge-like auxiliary member for static pressure measurement projecting from the exterior of said hollow structure at a position downstream of said static pressure measuring holes.

2. A fluid pressure sensing apparatus according to claim 1, wherein said pressure outlets are formed in side walls of said fluid pressure sensor element.

3. A fluid pressure sensing apparatus according to claim 1, wherein there is provided a single said fluid pressure sensor element.

4. A fluid pressure sensing apparatus according to claim 1, wherein there are provided a plurality of said fluid pressure sensor elements;
   wherein each of the total pressure outlets and each of the static pressure outlets are respectively connected by collecting pipes so that the total pressure chambers and the static pressure chambers communicate with each other; and
   wherein the collecting pipes are connected to the associated measuring instruments.

5. A fluid pressure sensing apparatus according to ony one of claims 1 to 4, wherein there is provided downstream of said fluid pressure sensor element, at least one rotatable damper blade is for adjusting the flow rate of the fluid.

6. A fluid pressure sensor element comprising a flat hollow structure which extends transverse to a direction in which a fluid flows through a duct, said hollow structure having therein a stationary partition extending transversely to the flow direction for dividing the interior of the hollow structure into an upstream chamber and a downstream chamber, a plurality of total pressure measuring holes extending through the upstream end wall of the hollow structure in the flow direction so that the upstream chamber of the hollow structure is open through said total pressure measuring holes, a plurality of static pressure measuring holes extending transversely of the flow direction through at least one wall of said hollow structure which extends parallel to the flow direction so that the downstream chamber of said hollow structure is open through said static pressure measuring holes, whereby the total pressure may be measured from the upstream chamber and the static pressure may be measured from the downstream chamber of said hollow structure, wherein a ridge-like auxiliary member for static pressure measurement is provided downstream of said static pressure measuring holes on the exterior of the hollow structure and extends transversely of the flow direction.

7. A fluid pressure sensor element according to claim 6, wherein the upstream end wall of the hollow structure in which said total pressure measuring holes are formed has a circular-arc cross section.

8. A fluid pressure sensor element according to claim 6 or 7, wherein said ridge-like auxiliary member for static pressure measurement is separately associated with each of said static pressure measuring holes.

9. A fluid pressure sensor element according to claim 6 or 7, wherein said ridge-like auxiliary member for static pressure measurement has a substantially triangular cross-section.

10. A fluid pressure sensor element according to claim 6 or 7, wherein said ridge-like auxiliary member for static pressure measurement has a substantially circular cross-section.

11. A fluid pressure sensor element according to claim 6 or 7, wherein said ridge-like auxiliary member for static pressure measurement has a substantially semicircular cross-section.

12. A fluid pressure sensor element according to claim 8, wherein said ridge-like auxiliary member for static pressure measurement has a substantially triangular cross-section.

* * * * *